Patented Aug. 2, 1938

2,125,508

UNITED STATES PATENT OFFICE 2,125,508

PROCESS OF PREPARING A SUBSTANCE PROMOTING LACTATION

Carl Ludwig Lautenschläger, Frankfort-on-the-Main, and Willy Ludwig, Frankfort-on-the-Main-Hochst, Germany, assignors to Winthrop Chemical Company, Inc., New York, N. Y., a corporation of New York No Drawing. Application January 9, 1937, Serial No. 119,868. In Germany January 15, 1936

4 Claims. (Cl. 167—74)

The present invention relates to the preparation of the substance promoting lactation from the anterior lobes of the hypophysis.

The parent material for the preparation of the substance promoting lactation has been fresh anterior lobes of the hypophysis or dried glands which contain all the active substances of the gland. Many attempts have been made to isolate and to separate these substances from the extracts containing them. These attempts have always been accompanied by very considerable losses; the separation of the gonad-stimulating substance from that promoting lactation is especially difficult.

Now we have found that the substance promoting lactation may be prepared by extracting the gonad-stimulating substance from the anterior lobes of the hypophysis and extracting the substance promoting lactation from the thus pre-treated gland. As starting material there may, for instance, be used glands which have been pre-treated by the process described in U. S. application Serial No. 94,877, filed August 7, 1936, in the name of Willy Ludwig. According to the process described in that patent application the gonad-stimulating substance and other active substances of the hypophysis are extracted and obtained in a high yield.

During the said process the anterior lobes of the hypophysis are extracted at a temperature not exceeding 60° C. with the aid of an organic solvent miscible with water and then with aqueous solvents. If the glands thus pre-treated and freed from the gonad-stimulating substance are treated with a strong alkali within the pH-limits of about 8.0 to about 12.0 in a manner similar to that in which non-pretreated hypophysis has hitherto been treated, there is obtained an extract of the substance promoting lactation which is to a large extent free from the gonad-stimulating substance. This extract is further treated, for instance, by precipitating the active substance near the isoelectric point i. e. at a pH-value of about 5.5, redissolving it in feebly alkaline water, suitably with addition of a disinfecting agent, freezing and drying the solution.

The improved industrial advantage of the invention resides in the fact that from the same gland material there may be obtained, in a yield of nearly 80 to 90 per cent, the important constituents, that are the gonad-stimulating substance and the substance promoting lactation, without the necessity for a subsequent detrimental separation of these two constituents from a common solution.

The following examples serve to illustrate the invention, but they are not intended to limit it thereto:

1. The moist residue of 15 grams of the anterior lobes of the hypophysis which previously have been extracted in the cold state four times with 15 grams of acetone each and then once with water is stirred with 150 cc. of water and the mixture is adjusted with N-caustic soda solution to a pH-value of 8.5. The mixture is then extracted and centrifuged for one hour at 35° C. This mixture is then extracted twice in the same manner at a pH-value of 9.0 and 10.0 respectively.

The united extracts are again centrifuged, the clear solution is adjusted to a pH-value of 5.0 and the precipitate thus produced is dried with alcohol.

2. The moist residue of 15 grams of the anterior lobes of the hypophysis which previously have been extracted in the cold state four times with 15 grams of acetone each and then once with water is extracted and centrifuged (as described in Example 1) at room temperature and at a pH-value of 8.5 to 11.5. The residue obtained by the subsequent precipitation at a pH-value of 5.0 is redissolved at a pH-value of 8.0 with addition of a disinfecting agent, for instance, sodium 2-ethyl-mercury-mercapto-benzoxazole-5-carboxylate the solution is brought to a proportion of 1:10000 and dried in a frozen state under reduced pressure.

We claim:

1. Process of preparing a substance promoting lactation which comprises extracting the anterior lobes of the hypophysis at a temperature not exceeding 60° C. with the aid of organic solvents miscible with water, extracting the remaining gland residue with water and then with an aqueous alkaline solution of a pH-value of about 8 to about 12 and precipitating the active substance from the alkaline extract by acidification.

2. Process of preparing a substance promoting lactation which comprises extracting the anterior lobes of the hypophysis at a temperature not exceeding 60° C. with the aid of organic solvents miscible with water, extracting the remaining gland residue with water and then with an aqueous alkaline solution of a pH-value of about 8 to about 12 and precipitating the active substance from the alkaline extract by acidifying it to a pH-value of 5.5.

3. Process of preparing a substance promoting lactation which comprises extracting the anterior lobes of the hypophysis at a temperature not exceeding 60° C. with the aid of organic solvents miscible with water, extracting the remaining gland residue with water and then with an aqueous alkali solution of a pH-value of about 8 to about 12 and precipitating the active substance from the alkaline extract by acidifying it to a pH-value of 5.5, redissolving the precipitate in an aqueous alkaline solution, freezing and drying the solution.

4. Process of preparing a substance promoting lactation which comprises extracting the anterior lobes of the hypophysis at a temperature not exceeding 60° C. with the aid of organic solvents miscible with water, extracting the remaining gland residue with water and then with an aqueous alkali solution of a pH-value of about 8 to about 12 and precipitating the active substance from the alkaline extract by acidifying it to a pH-value of 5.5, redissolving the precipitate in an aqueous alkaline solution in the presence of a disinfecting agent, freezing and drying the solution.

CARL LUDWIG LAUTENSCHLÄGER.
WILLY LUDWIG.